March 20, 1956 C. G. BLAIR 2,738,675
GAUGE FOR LIQUID STORAGE TANKS
Filed Aug. 20, 1954
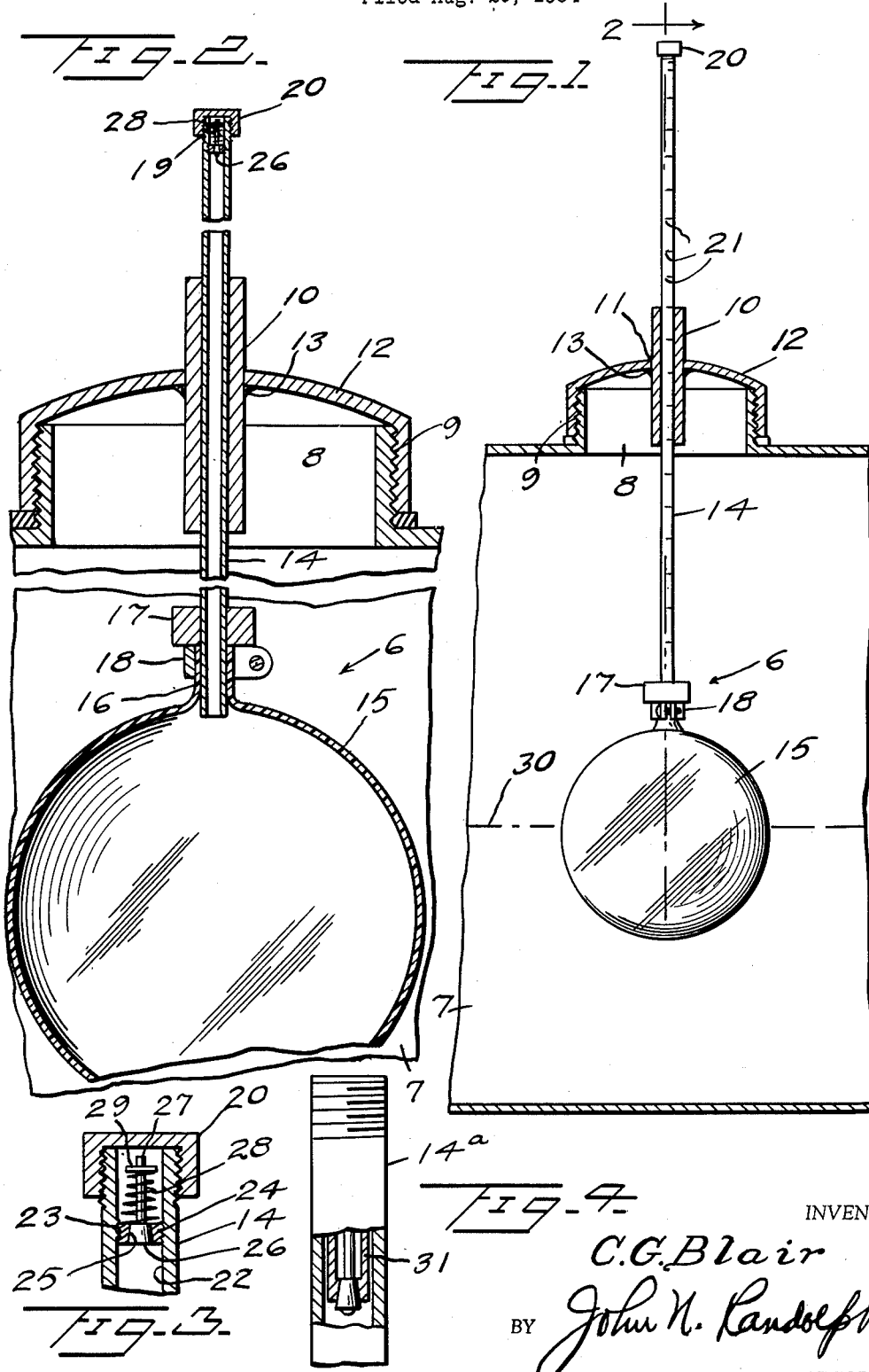
INVENTOR
C. G. Blair
BY John N. Randolph
ATTORNEY

United States Patent Office 2,738,675
Patented Mar. 20, 1956

2,738,675

GAUGE FOR LIQUID STORAGE TANKS

Charles G. Blair, Augusta, Ga.

Application August 20, 1954, Serial No. 451,230

3 Claims. (Cl. 73—322)

This invention relates to a novel gauge for use with a liquid storage tank for indicating the amount of liquid in the tank and which is primarily adapted for use with storage tanks for fuel oil but which may obviously be utilized with any other similar liquid storage tank.

Fuel oil storage tanks and similar liquid storage tanks are normally provided with a single flanged top opening forming a filling neck the internal diameter of which is inadequate for the insertion therethrough of a float of sufficient size to function with other parts to provide an accurate liquid level gauge for indicating the amount of liquid in such a storage tank. Accordingly, it is a primary object of the present invention to provide a novel liquid level gauge which may be readily associated with a slightly modified form of closure cap for sealing the filling neck of such storage tanks and the float of which may be extended after being inserted downwardly through the filling neck of the tank and enlarged to an adequate size to enable the gauge to function efficiently and which constitutes a size substantially larger than the diameter of the opening defined by the filling neck.

A further object of the invention is to provide such a gauge for liquid storage tanks which may be very economically manufactured and sold yet which will be extremely efficient and durable in accomplishing its intended result.

Various other objects and advantages of the invention will hereinafter become more fully apparent from the following description of the drawing, illustrating presently preferred embodiments thereof, and wherein:

Figure 1 is a fragmentary vertical sectional view of a portion of a storage tank showing the gauge applied thereto;

Figure 2 is an enlarged fragmentary vertical sectional view of the gauge, taken substantially along a plane as indicated by the line 2—2 of Figure 1;

Figure 3 is an enlarged vertical sectional view of the upper end of the gauge, and Figure 4 is an enlarged fragmentary elevational view, partly in section, of a slightly modified form of the upper end of the gauge.

Referring more specifically to the drawing, for the purpose of illustrating the preferred application and use of the improved gauge, designated generally 6 and comprising the invention, a portion of a liquid storage tank 7 is illustrated in Figures 1 and 2 and which may be assumed to be a storage tank for fuel oil such as is used for supplying oil to a heating furnace. The tank 7 in the top part thereof is provided with an externally flanged opening forming a filling neck 8 which is externally threaded, as seen at 9, to receive a threaded closure cap.

The gauge 6 comprises a guide sleeve 10 which extends preferably centrally through an opening 11 in the top of an internally threaded cap 12, and which sleeve 10 is suitably secured as by soldering or welding, as seen at 13 to the cap 12.

An elongated rigid tube 14 is slidably disposed in the guide sleeve 10 and has a relatively close fitting sliding engagement therein. The tube 14 is threaded upwardly through the sleeve 10, before the cap 12 is applied to the filling neck 8. An inflatable float 15, preferably in the form of a plastic sack but which may be formed of other materials which are impervious to air and liquid, such as rubber, has a restricted outwardly opening neck 16 of relatively small diameter and which is preferably stretched to fit over the lower end of the tube 14. Before the neck 16 is applied to the lower end of the tube 14, a weight 17 such as a metal collar or washer is applied to the lower end of the tube 14 and has a relatively close fitting sliding engagement thereon. After the neck 16 is engaged around the lower portion of the tube 14, beneath the weight 17, said neck is secured to the tube in any suitable manner to provide an airtight joint between the tube and neck, as by means of a split clamp 18 which is tightened around the neck 16 for tightly clamping said neck to the tube 14. The clamping or anchoring means 18 provides a support on which the weight 17 rests. The upper end of the tube 14 is externally threaded as seen at 19 to receive a threaded closure cap 20 which is detachably secured thereon. The thread 19 is cut into the tube 14 so that its external diameter is no greater than the external diameter of the remainder of the tube so that the threaded tube portion 19 may be passed upwardly through a guide sleeve 10. The tube 14 is provided with longitudinally spaced graduations 21 adapted to function with the upper end of the guide sleeve 10 for indicating the liquid level within the tank 7 as will hereinafter be described.

As illustrated in Figures 2 and 3, the bore 22 of the tube 14, near its upper end, is provided with an internally restricted threaded portion 23 to receive an externally threaded annular member 24 having an upwardly tapered bore 25 forming a valve seat and passage and in which an upwardly tapered valve 26 normally seats. The valve 26 has an upwardly projecting stem 27 which extends upwardly from the member 24 and which terminates below the upper end of the tube 14, when the valve 26 is in a closed, seated position as seen in Figures 2 and 3. A weak coiled expansion spring 28 is disposed around the valve stem 27 and has a lower end resting on the upper surface of the annular member 24 and an upper end bearing against a stop pin 29 which extends transversely through the stem 27, near the upper end of said stem. The spring 28 needs only to be of sufficient strength to retain the valve 26 in its closed position.

From the foregoing it will be readily apparent that with the float 15 deflated and collapsed that it can be readily inserted downwardly through the filling neck 8, together with the collar 18 and weight 17. With the float 15 disposed within the tank 7 and below the neck 8, the cap 20 can be removed and the float 15 inflated, similar to a balloon, by placing the mouth on the upper end of the tube 14 and blowing through the tube. The air pressure thus provided will be adequate to unseat the valve 26 to permit the air to pass through the passage 25 and bore 22 for inflating the float 15 to a diameter larger than the diameter of the filling neck 8 and of adequate size and buoyancy to support the weight of the tube and the parts carried thereby. The cap 20 can then be reapplied to the upper threaded tube end 19 and will function in combination with the parts 17 and 18 to retain the tube 14 in engagement with the guide sleeve 10. The cap 12 is then threadedly applied to the threaded neck portion 9 to close the filling neck 8. The float 15 will be supported by the liquid within the tank 7, as indicated by the liquid level line 30, to support the tube 14 and parts carried thereby relative to the guide sleeve 10 and cap 12. It will thus be readily apparent that the extent to which the tube extends from the upper end of the guide sleeve 10 will indicate the amount of liquid in the tank 7, by means of the graduations 21 which may be read in conjunction with the upper end of said sleeve 10. As the liquid level 30 falls in the tank 7 the weight 17 will insure downward movement of the tube 14 to maintain the float 15 partially submerged in the liquid as illustrated in Figures 1 and 2, for thus cooperating with the float and tube 14 to accurately indicate the amount of liquid in the tank. To refill the tank 7, it is only necessary to remove the cap 12 and displace it laterally with respect to the neck 8 so that the tube 14 will engage against a part of the wall of said neck. When thus disposed, the tube 14 is of such a small diameter that it will not interfere with the insertion of a hose nozzle, not shown, into the filling 8 for refilling the tank 7. After removal of the hose nozzle, the cap 12 is reapplied, as previously described.

If desired, the parts 24 to 29 may be omitted from the tube 14 and the float 15 can be inflated in the same manner as previously described and the cap 20 replaced before any appreciable amount of air can escape from the float 15. The cap 20 will then function to seal the upper end of the tube 14 to maintain the float 15 inflated.

If desired, the upper end of the tube may be constructed similarly to the upper portion of a conventional valve stem of a pneumatic tire inner tube, as shown at 14a in Figure 4, and may be provided with a removable valve insert 31 of the conventional type normally used in inner tube valve stems. The float 15 may then be inflated by the use of a small hand pump attached to the upper end of the tube 14a. Likewise, the cap 20 may be applied to the upper end of the tube 14a after inflation of the float 15.

Various other modifications and changes are contemplated and may obviously be resorted to, without departing from the spirit or scope of the invention as hereinafter defined by the appended claims.

I claim as my invention:

1. A gauge for liquid storage tanks comprising, a storage tank having an upwardly opening filling neck, a cap removably mounted on and normally closing said neck, a guide sleeve extending through and secured in said cap substantially parallel to the axis of the cap and the filling neck engaged thereby, a rigid tube extending slidably through said guide sleeve having an open lower end disposed within the tank and an open upper end disposed above the guide sleeve and cap and externally of the tank, an inflatable float having a neck portion disposed around and secured to the lower end of said tube, said float when collapsed being insertable through the filling neck opening into the tank, said float being inflatable within the tank by air under pressure supplied to the float through the tube from the upper end thereof, and means for sealing the bore of the tube to prevent the passage of air therethrough to maintain the float inflated to a larger size as measured transversely of the tube than the diameter of the filling neck, and a weight supported on said tube below the guide sleeve and immediately above the float neck for urging the tube downwardly through the guide sleeve as the liquid level falls in said tank.

2. A gauge for liquid storage tanks comprising, a storage tank having an upwardly opening filling neck, a cap removably mounted on and normally closing said neck, a guide sleeve extending through and secured in said cap substantially parallel to the axis of the cap and the filling neck engaged thereby, a rigid tube extending slidably through said guide sleeve having an open lower end disposed within the tank and an open upper end disposed above the guide sleeve and cap and externally of the tank, an inflatable float having a neck portion disposed around and secured to the lower end of said tube, said float when collapsed being insertable through the filling neck opening into the tank, said float being inflatable within the tank by air under pressure supplied to the float through the tube from the upper end thereof, and means for sealing the bore of the tube to prevent the passage of air therethrough to maintain the float inflated to a larger size as measured transversely of the tube than the diameter of the filling neck, said means for closing the upper end of the tube for sealing the air in the float comprising a cap detachably secured to the upper end of said tube for closing and sealing said upper end, said cap forming a stop sized to engage the upper end of the guide sleeve to limit downward movement of the tube through the guide sleeve.

3. In combination with a liquid storage tank having a filling opening in the top thereof, a removable closure for said filling opening, a rigid tube extending slidably through said closure and having an open lower end extending loosely through the filling opening and into said tank and an open upper end disposed above the closure, an inflatable float having a neck portion disposed around and secured to the lower end of said tube, said float when collapsed being capable of being passed through the filling opening, said float being inflated by air under pressure supplied thereto through the tube while the float is within the tank, said float being of a size incapable of passing through the filling opening when inflated, and means for sealing said tube to prevent the escape of the compressed air from the float through said tube.

References Cited in the file of this patent

UNITED STATES PATENTS

| | | |
|---|---|---|
| 1,489,957 | Morton | Apr. 8, 1924 |
| 1,581,440 | Hammerstrom | Apr. 20, 1926 |
| 1,602,063 | Williams | Oct. 5, 1926 |
| 2,211,068 | McDonald | Aug. 13, 1940 |
| 2,314,540 | Huntington | Mar. 23, 1943 |
| 2,588,667 | Stutzman | Mar. 11, 1952 |
| 2,652,067 | Hosking | Sept. 15, 1953 |